United States Patent [19]
Hunnicutt et al.

[11] 3,754,427
[45] Aug. 28, 1973

[54] METHOD FOR REFORMING AND STRAIGHTENING MEMBERS

[75] Inventors: Wayne E. Hunnicutt, Big Bend; Peter G. Rossbach, Waukesha, both of Wis.

[73] Assignee: Applied Power Industries, Inc., Milwaukee, Wis.

[22] Filed: Apr. 19, 1971

[21] Appl. No.: 135,274

Related U.S. Application Data
[62] Division of Ser. No. 744,824, July 15, 1968, Pat. No. 3,590,623.

[52] U.S. Cl. .................. 72/302, 72/705, 254/93 R
[51] Int. Cl. ............................................ B21d 11/02
[58] Field of Search ............... 254/93 R; 72/705, 72/302

[56] References Cited
UNITED STATES PATENTS

| | | | |
|---|---|---|---|
| 2,757,903 | 8/1956 | Bill | 254/93 R |
| 1,717,485 | 6/1929 | Wirz | 254/93 R |
| 2,802,635 | 8/1957 | Engelbart | 254/93 R |
| 3,085,785 | 4/1963 | Peterson | 254/93 R |
| 1,690,181 | 11/1928 | Sederholm | 254/93 R |

Primary Examiner—Charles W. Lanham
Assistant Examiner—R. M. Rogers
Attorney—Petherbridge, O'Neill & Aubell

[57] ABSTRACT

A method and apparatus are disclosed for reforming and straightening members such as bent or damaged bodies and frames of vehicles, and portions thereof, wherein a force effective from a platform surface is applied via force transmitting means to straighten said bodies and frames.

6 Claims, 21 Drawing Figures

Patented Aug. 28, 1973

INVENTORS.
WAYNE E. HUNNICUTT
PETER G. ROSSBACH

BY Petherbridge, O'Neill &
Lindgren

ATTORNEYS.

Patented Aug. 28, 1973

INVENTORS
WAYNE E. HUNNICUTT
PETER G. ROSSBACH
Pethenbridge, O'Neill
BY Lindgren
ATTORNEYS

METHOD FOR REFORMING AND STRAIGHTENING MEMBERS

This is a division of application Ser. No. 744,824 filed July 15, 1968 now U.S. Pat. No. 3590623.

Prior known permanently installed or fixed equipment for repairing collision damaged bodies and frames of vehicles presents problems in that such equipment is bulky and requires large space for use as well as for storage. Such prior known equipment lacks mobility and versatility, and is difficult to connect and position to provide the proper straightening forces to a damaged member. Also, the particular stall space in which such equipment is installed is limited in use only for body and frame straightening activities, or other closely associated work.

Prior known portable type body and frame straighteners having a horizontal beam and an upright movable arm are generally limited to the application of force in the plane of the horizontal beam and of the upright arm. Accordingly, such portable frame straighteners are limited in their capability of applying forces directed in vertical directions as often needed in straightening operations. However, it has been found that portable frame straighteners possess the advantage of being capable of moving with the vehicle parts as the parts are being straightened, to thereby provide a better or more accurate straightening of the bent or damaged member.

The present invention effectively eliminates the disadvantages of the fixed or permanently installed frame straightener apparatus in that it is light in weight, not bulky, hence stores easily and conveniently and it is very versatile in operation. Moreover, the present invention retains the above cited advantages of the portable equipment and additionally provides means of applying the straightening forces from practically unlimited directions and locations. The invention also provides a means for selectively guiding the straightening forces or, at the operator's discretion, allowing self alignment of the force applying means and the damaged portion of the vehicle to occur in a stable manner. The capability afforded by the inventive apparatus of providing a guided direction of movement of the force applying means is equivalent to the force applied by certain permanent installations and is desirable for certain types of repair operations. The invention also eliminates the disadvantage of prior art portable frame straighteners in that it provides a convenient means of applying one or more forces in a variety of directions separately or concurrently.

More specifically, the present invention employs new geometrical relationships to provide a new, improved method and apparatus for straightening frames and bodies of automotive vehicles. The invention utilizes a force applying means acting on a force transmitting means or member which may be flexible, such as a chain, from any number of selectively variable non-discrete, force applying points on a platform surface. An important aspect is that the force applying means is pivotable about a horizontal plane to about 30° above the plane; the force applying means is also rotatable 360° about a vertical axis. The force applying means applies force to the force transmitting means which seek a stable plane of application. There is no necessity for providing any additional means for maintaining directional control of the applied forces to cause the inventive apparatus to operate in a stable condition; that is, the inventive apparatus seeks it own stable operating plane or position.

The apparatus of the present invention includes a platform or base essentially at floor level onto which a vehicle to be repaired can be conveniently moved. Anchor means comprising unique clamp assemblies are removably connectable to the platform at any one of a number of positions. One end of a force applying means such as a hydraulic strut or ram is removably received by an anchor means for simultaneous rotary and pivotal movement; and, the other end of the force applying means is removably engageable to a flexible force transmitting means such as a chain. One end of the chain is anchored to the platform by another anchor means and the other end of the chain may be attached to the member to be straightened as by bolts, clamps, etc., as is well known. As the force applying means is actuated the vectoral forces, acting through the chain to straighten the bent member, tend toward a balance to thus automatically and continuously locate the force applying means and the chain in the stable operating plane or position, as will be explained. Accordingly, complete directional control of the straightening forces is maintained as the force applying means is actuated to straighten the bent or damaged member.

A principal advantage of the method and apparatus of the invention is that it provides wide flexibility of direction in which a controlled force can be applied. Also, as will be evident, any desired number of independent or cooperating force applying means and force transmitting members may be concurrently connected or set up to apply straightening forces to a vehicle. Such set ups can be made fast and easily for effecting the necessary pulling or straightening forces to the vehicle. Thus, the invention provides the capability of conveniently setting up multiple pulls to be performed concurrently in various planes, directions and locations.

The foregoing and other advantages and features of the invention will be apparent from the following more particular description of preferred embodiments of the invention, as illustrated in the accompanying drawings wherein:

METHOD AND APPARATUS:

As mentioned above, the present invention relates to a new, improved method and apparatus for straightening damaged or bent bodies and frames of automotive vehicles or portions thereof such as the doors, bumpers, hoods, etc. of the vehicles.

Figures 4, 5:
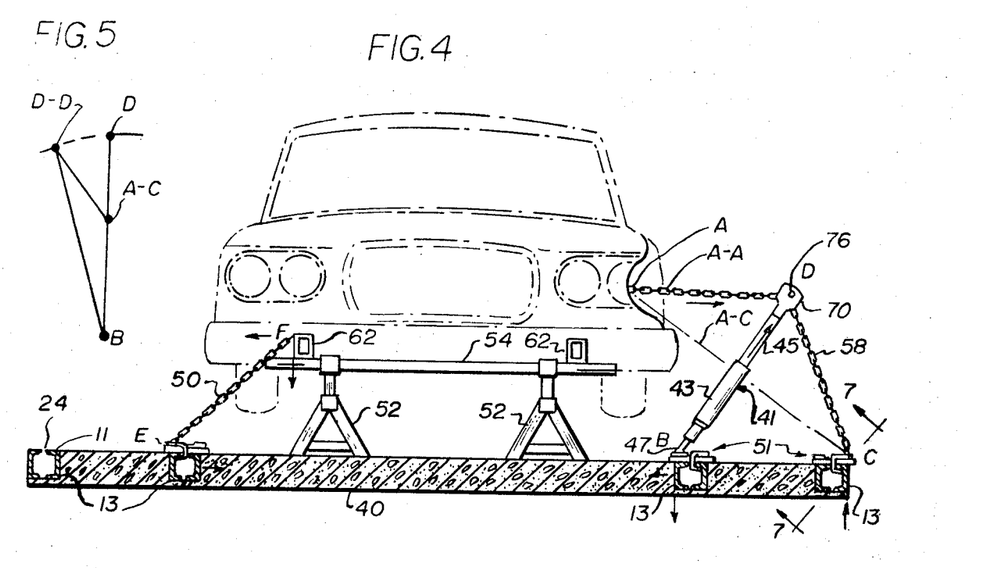
FIG. 4 is a view illustrating a typical arrangement of apparatus of the present invention.
FIG. 5 is a diagram illustrating the operation of the arrangement of the system area of FIG. 4.

Referring first to FIG. 4, a quick view of certain features and functioning of the invention will be described, then more specific details thereof will be explained.

The apparatus of the present invention comprises a platform 11 or base (see also FIG. 1) including a number of beams 13 having elongated slots 24 for receiving anchor means such as clamp assemblies 51, see also FIGS. 5–8. For purposes of operation, one end of a flexible force transmitting or tie means such as a chain 58 is removably connectable to a clamp assembly or ram foot 51, as at C. The other end of the chain may be connected as at A to the damaged or bent member requiring reforming straightening. Force applying means, such as an adjustable hydraulic strut or ram 41 is swivelably mounted, as at B, at one end on a second and similar clamp assembly 51. The strut 41 includes a head portion 70 for engagement with the chain 58, as at D. The strut 41 is arranged to be extended, as by hydraulic pressure, as is known in the art, to provide an upward force intermediate the ends of a chain 58.

The force applying strut 41 is rotatable and capable of applying a force 360° about a vertical axis and is pivotable about a horizontal plane to incline to about 30° of the horizontal plane. Note from FIG. 4 that, once set, the length of the chain 58 from point C to point D is constant and the length of the chain from point D to point A is constant. Accordingly, as the strut 41 is extended, the angle A,D,C of the chain 58 is changed to thereby provide a pulling force on the vehicle body or frame as will be further explained hereinafter. The strut 41 is provided with various lengths of cylinders 43 and extensions 45 to change its overall effective length, and various lengths of chains 58 may be utilized to make connections to desired parts of the vehicle and to the selected points on the platform 11.

As mentioned above, any number of rams, clamps and chains arranged to provide different pulling actions to the vehicle may be concurrently employed to straighten the same or different damaged areas of the vehicle.

PLATFORM

Figures 1, 2, 3:
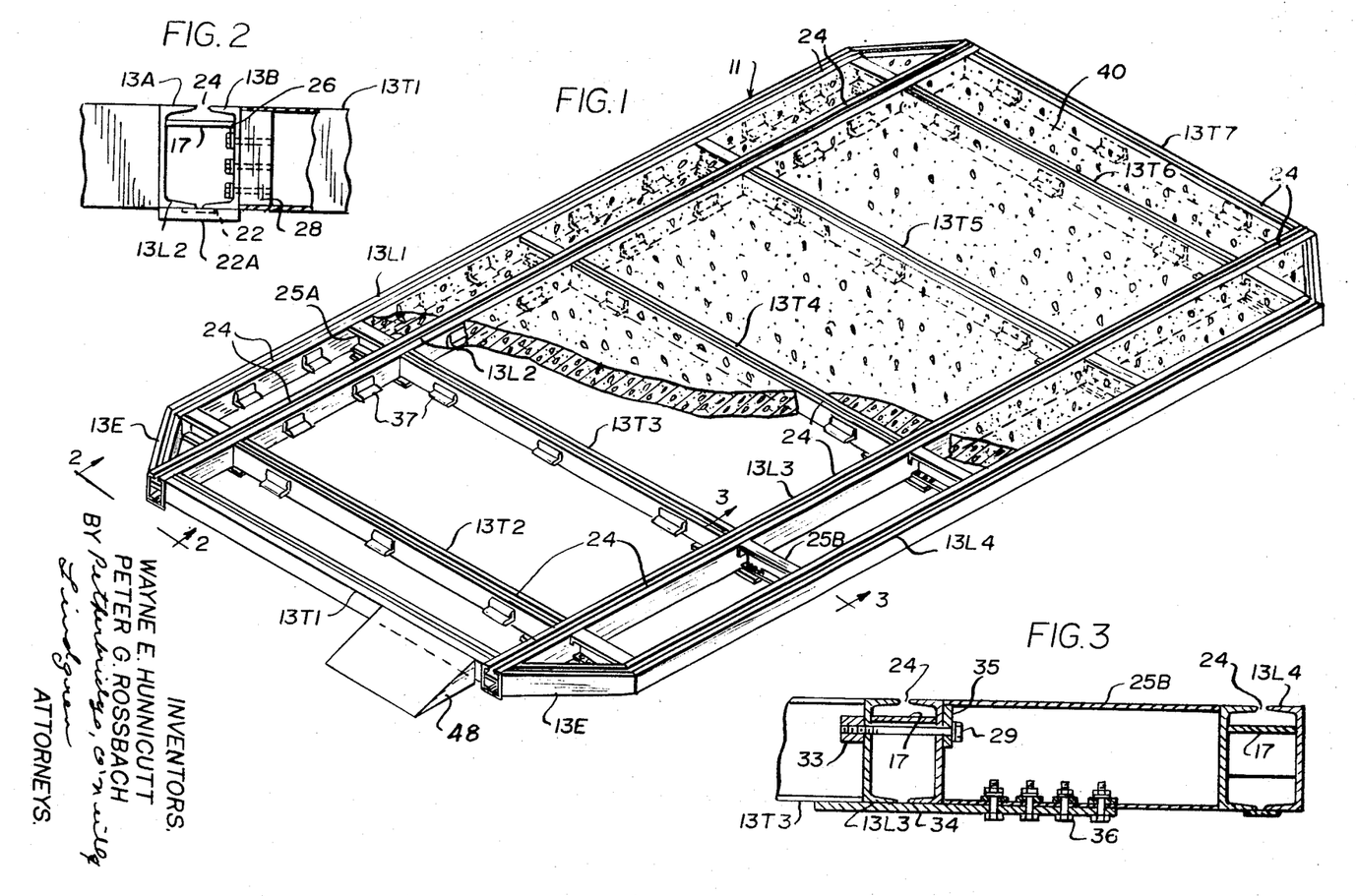
FIG. 1 is a perspective view of a platform constructed in accordance with the present invention and showing a portion of the included concrete in cross section to facilitate illustration.
FIG. 2 is a view taken along line 2—2 of FIG. 1 and partially in cross section to facilitate illustration.
FIG. 3 is a view taken along line 3—3 of FIG. 1.

Referring now to FIG. 1, the platform or base 11 of the invention comprises a generally rectangular structure, formed of C-shaped channels affixed adjacent one another to provide rectangular beams, generally labeled 13 (see also FIGS. 2 and 3).

In the embodiment shown, the platform 11 comprises four spaced beams 13L1–13L4 extending in a lengthwise direction, and seven spaced beams 13T1–13T7 extending in the transverse direction. While in the embodiment shown, platform 11 is about 23 feet in length and 14 feet in width, other configurations might likewise be used. As will be appreciated, the platform should conveniently be of sufficiently large dimensions such as to provide anchoring points outside of the peripheral outline of the vehicle being worked upon.

As best seen in FIG. 2, the C-shaped channels 13A and 13B are joined as by welded plates 22 and 22A and positioned to be in spaced relation to form an elongated slot 24 along the entire length of the beam to receive the clamp assembly as will be explained in detail. Spacer members 17 intermittently spaced within the beam 13 obtain the proper spacing of channels 13A and 13B for the slots 24, and also function as a horizontal load carrying member at each beam intersection.

Transverse beam 13T1 is connected to the lengthwise extending beam 13L2 by suitable bolts 26 which engage threaded plate 28 welded to the end of the transverse beam 13T1. Beam 13T1 is similarly connected to beam 13L3. The transverse beam 13T7 at the other end of platfrom 11 is connected in a similar way to respective lengthwise extending beams 13L2 and 13L3.

Angled corner beams, generally labeled 13E, also comprising a pair of channels 13A and 13B are welded on each corner of the platform 11 to provide surfaces at better, or more normal angles for force application when a pulling or pushing force is to be applied to the vehicle which force is to be at an angle to the longitudinal or transverse axes of the vehicle.

The transverse beams 13T2–13T6 each comprise a center section and two side I-channel sections, only the side sections 25A and 25B for transverse beam 13T2 are labeled in FIG. 1. The transverse beams 13T2-13T6 and the side sections 25A and 25B are connected to the lengthwise beams similarly as shown in FIG. 3. Note that FIG. 3 specifically shows the connection of transverse beam 13T3 and side section 25B to lengthwise extending beams 13L3 and 13L4.

Transverse beam 13T3 is welded to plate 34 which extends beneath side section 25B. Section 25B is connected by nut and bolt assembly 36 to plate 34. A suitable block 33 is welded to the end of beam 13T3, and a downward flange 35 at the end of section 25B provides an engagement surface for the nut and bolt assembly 29 to affix the upper portion of beam 13T3 to section 25B. As mentioned above, spacer 17 is placed within the beam to assist in maintaining the spacing of the slot 24 and to provide a compression member for beam 13L3 and the joint of beam 13T3 beam 13L3 and side section 25B.

While it is, of course, understood that the platform 11 might be of a totally welded construction, the bolt and nut assemblies are employed in the embodiment shown for convenience in shipping the individual components and for convenience during subsequent installation.

L-shaped plates 37 are positioned on the side of each of beams 13 to provide a means of anchoring the platform 11 to the concrete 40 which is poured after the platform is in position to provide a level surface with the top of the C-channels.

If the platform 11 is to be placed on the shop floor two ramps such as 48 (only one of which is shown) may be employed to permit a vehicle to be conveniently rolled onto the platform. Where the platform is to be sunken into the floor, ramps 48 are obviously not necessary.

It will thus be seen that the platform is constructed of structural steel beams or members assembled in the form of a frame-work, into which concrete is poured to form a flat surface which in one embodiment, and as mentioned above, is approximately 23 feet long by approximately 14 feet wide. The structural beams are so arranged as to provide a number of longitudinally and transversely extending slots 24 in the top surface, some of which lie outside the plan outline of vehicle to be repaired. As will be explained, the slots in the platform provide a means of anchoring a chain or positioning a hydraulic ram at selected positions along the platform by using suitable locking clamps. Additional beams may be included to increase or decrease the dimensions of the platform. Also, more longitudinal and transverse beams may be included for providing additional anchoring points on the platform 11, as desired.

The vehicle to be repaired may have its frame 62 supported on safety stands 52 and cross-tubes 54 above the platform, see FIG. 4, for convenience when working under the vehicle and to provide firm support for the vehicle. For certain straightening operations, the vehicle need not be supported on the safety stands and cross-tubes, and the vehicle wheels may be directly on the platform 11.

As mentioned, the platform of the invention may rest on the floor of a shop, and a slight ramp may be provided to enable the vehicle to be rolled onto the platform; or, the platform may be arranged to be sunken in the floor to have its upper surface at the level of the shop floor. The present invention thus reduces the difficulties of positioning or moving vehicles having damaged, inoperative or detached wheels onto the platform. Conventional dollies, wheeled or portable lifts can be utilized to move such vehicles onto the platform without having to make use of a wrecker or an overhead hoist. There are no upstanding struts, beams or columns that must be avoided in order to properly place the car on the platform. Further, there is no requirement that the vehicle be placed on the platform of the invention to be aligned with any particular rail or runway, or other positioning indicia. Also, the invention provides a flat floor on which to work with an unobstructed working space below the vehicle.

Another important advantage of the invention is the capability afforded of using the platform surface area for many other types of work when the platform is not being used for straightening vehicles.

FORCE APPLYING MEANS

Referring now also to FIG. 4, the invention provides a flexible force transmitting or tieing means such as a chain 58 having one end anchored to the platform 11 and the other end attachable to the frame of body of the vehicle to be straightened. The force applying means such as a hydraulic strut 41 is arranged to have one end pivotably affixed to the platform as by anchoring means such as clamp assemblies 51 and having its other end attached to the chain. The chain 58 is also anchored in position as by clamp assembly 51. As the strut 41 is extended, the geometric configuration of the chain 58 is changed to effect a pulling force on the vehicle.

Note that the clamp assemblies 51 for the chain 58 or the strut 41 can be readily moved along the slots 24 of the platform 11. Thus, as mentioned above, since the anchoring and the force applying means can be readily varied, an infinite variety of combinations and connections of force application and the direction of said applied forces can be provided to the member to be straightened.

The embodiment of the invention shown in FIG. 4 comprises an hydraulically actuatable strut or ram 41 comprising a cylinder 43 and a plunger or extension 45 extensible in cylinder 43. The strut 41 may be of any suitable known type preferably similar to the Porto-Power hydraulic ram manufactured by Blackhawk Manufacturing Co., Milwaukee, Wisc. The inventive system may include various lengths of extensions 45 to conveniently adapt each strut for applying force to the chain 58 at various heights or distances.

A ball 47 is formed at one end (the lower end as oriented in FIG. 4) of cylinder 43. Ball 47 functions as a ball jointer bearing which is removably disposed in a socket 49 of a clamp assembly 51, for free rotating, pivoting and swivelling motion, as clearly appears in FIGS. 6 and 7, and as will be explained hereinbelow.

Figures 8, 9, 10, 10A, 11:
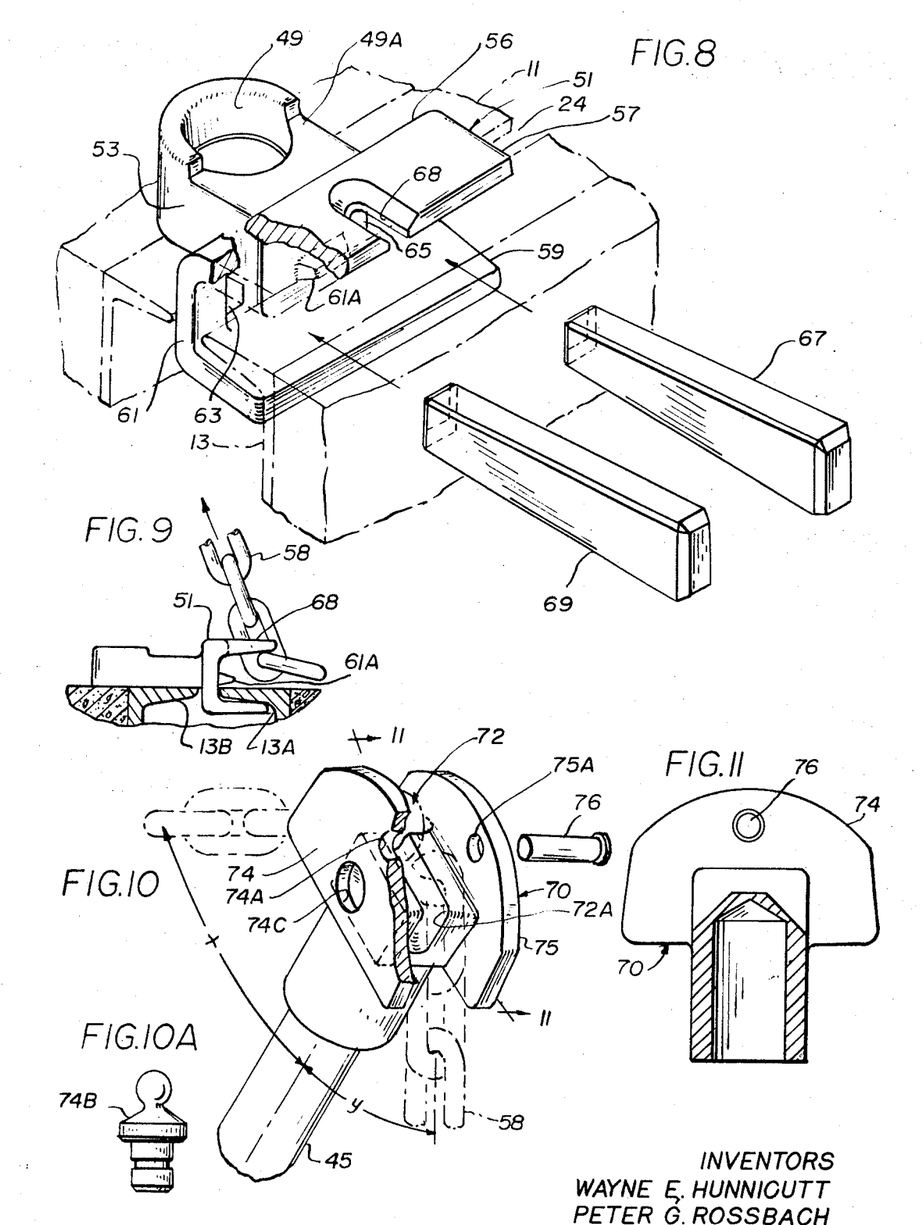
FIG. 8 is an exploded perspective view illustrating a clamp assembly of the present invention.
FIG. 9 is a side view of a chain affixed to the clamp assembly of FIG. 8.
FIG. 10 is an enlarged perspective view of a head assembly of the present invention.
FIG. 10A is a view of the knuckle member receivable in the socket 74A of the head of FIG. 10.
FIG. 11 is a view in partial section taken along line 11—11 of FIG. 10.

The extension or plunger 45 of strut 41 includes a chain receiving and positioning head 70, as clearly shown in FIGS. 10 and 11. Head 70 has a U-shaped configuration with the center bight portion 72 having a slot 72A along its center for receiving links of the chain 58. The spaced apart flanges 74 and 75 of the head 70 each include a hole 74A and 75A, respectively, for receiving a lock pin 76. The pin 76 provides a safety lock to lock the chain links in head 70 and to prevent any slippage between the head 70 and the chain 58 when the angles x and y at which the forces acting on the chain 58 are unequal.

Flange 74 of head 70 includes a recess 74C for removably receiving a knuckle or nipple 74B, shown in FIG. 10A. Knuckle 74B is connectable to a rigid tubing, for purposes to be described.

CLAMP ASSEMBLY (RAM FOOT)

The clamp assembly or ram foot 51, see also FIG. 8, includes a body section or portion 53 defining a ball joint receiving socket 49. The wall of socket 49 is lowered at 49A approximately along half of its periphery to permit the strut 41 to incline to a lower angle during operation, see also FIG. 7. Body portion 53 connects to the bight portion 61 of a slot engaging section 56 which is U-shaped in cross section and has two spaced apart parallel flanges 57 and 59 separated by the bight portion 61. The flanges 57 and 59 are relatively longer than body portion 53 and in normal use extend in horizontal planes. The upper (as oriented in FIGS. 6-9) flange 57 lies, substantially in a plane with the upper surface of body portion 53 and the lower (as oriented in FIGS. 6–9) flange 59 lies in a plane somewhat below the lower surface of body portion 53, for purposes which will become clear.

The inner periphery, that is, the surface of bight portion 61 bounded by flanges 57 and 59 includes a small shoulder or protrusion 61A extending parallel to flanges 57 and 59, and positioned slightly below a mid line between the flanges.

To mount or position clamp assembly 51 in the slot 24 of a beam 13, the lower flange 59 is inserted in slot 24 to a position below the web of either one of the channels of beam 13, and next the body portion 53 of clamp assembly 51 is pushed down to rest on the other channel. Shoulder 61A is dimensioned to have its lower surface bear on the top of a channel of beam 13 to maintain the clamp 51 in a position allowing easy insertion of wedges 67 and 69 between flange 57 and beam 13.

A slot 68 is formed in the upper (as oriented in FIG. 8) flange 57 of clamp assembly 51 for receiving and holding a chain 58, as clearly seen in the side view of FIG. 9. The chain 58 is hooked or anchored in clamp assembly 51 by pushing a link of the chain into slot 68.

The bight portion 61 is apertured as at 63 and 65 adjacent each side of the body portion 53 to receive wedges 67 and 69. Wedges 67 and 69 comprise elongated tapered bars which may be driven through respective apertures 63 and 65 and on top of the beam 13 to securely wedge the clamp assembly 51 in position as shown in FIGS. 6 and 7.

Figure 6:
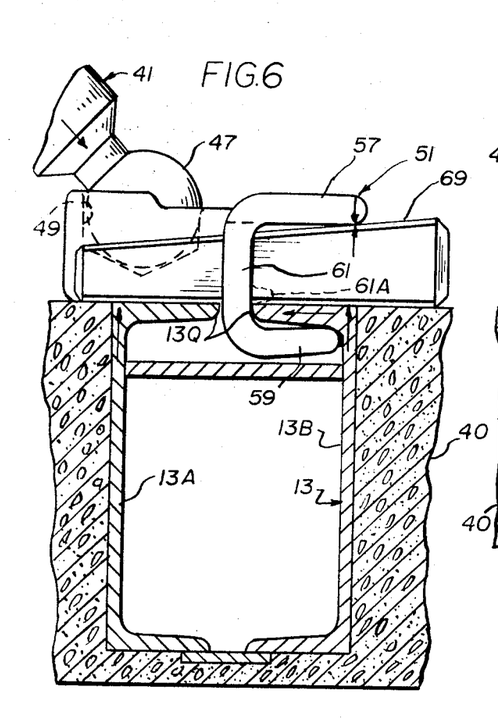
FIG. 6 is an enlarged fragmentary view in side elevation illustrating a ball and socket arrangement employing the clamp assembly of FIG. 4.
Figure 7:
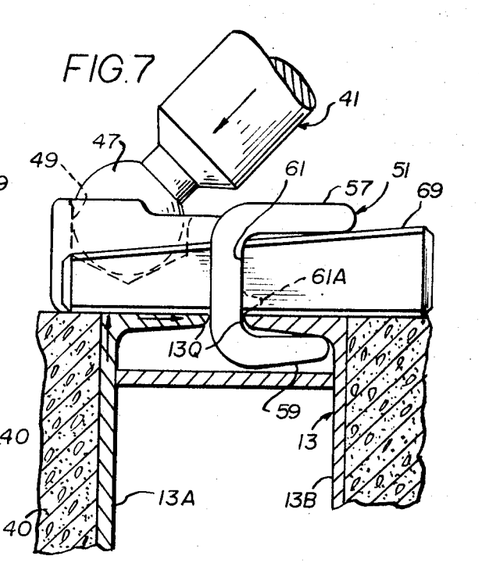
FIG. 7 is an enlarged side view in partial section, similar to FIG. 6, and showing the ball in a position different from FIG. 6.

Refer now to FIGS. 6 and 7 and to the action or function of the clamp assembly 51. In FIG. 6, the strut or ram effects a load through its ball 47 to the clamp assembly 51 and the clamp assembly 51 transfers this load to the beam 13. The principal loading is carried vertically by the web of the channel 13A, as indicated by the arrow. The wedges 67 and 69 bridge the space between the webs 13A and 13B, and any load over-turn movement of the clamp assembly 51 is transferred to the wedges 67 and 69 thence to the web of the channel 13B. Any horizontal loading is carried by the upper flange of the channel 13B and by the surrounding reinforcing concrete. Note that the tips 13Q of the flanges are not loaded vertically.

FIG. 7 shows the strut 41 applying a force to clamp assembly 51 at an angle different from that of FIG. 6. The principal vertical loading is again carried by the web of the channel 13A and the surrounding concrete. Again, the tips 13Q of the flanges are not vertically stressed. Wedges 67 and 69 prevent skidding of the clamp assembly 51 along the length of slot 24.

When chain 58 is connected to the clamp assembly, see FIG. 9, the load on the chain 58 is held or reacted by the flange of the channels 13A or 13B adjacent the web; and, any overturn moment is reacted by the web of the second channel whether or not the wedges 67 and 69 are inserted in position.

Thus, clamp assembly 51 functions to provide a footing or base for the ball 47 of the strut 41 and/or as an anchor for a chain 58. Note also that the clamp assembly may be selectively positioned in an analog, continuous or non-discrete manner on beams 13.

OPERATION

Now that details of the several components of the apparatus have been described, further explanation will be made of the method of operation of the invention.

In operation, a vehicle to be worked upon may be placed on the platfrom 11, and may be lifted by suitable jacks and placed onto the safety stands 52 and crosstubes 54 (see FIGS. 4, 13, 14) as mentioned above and as is well known in the art.

The vehicle to be repaired must be anchored to the platform 11 as by one or more reaction chains 50 (FIG. 4) in such a manner as to resist any pulling force and avoid skidding the entire vehicle on the platform, as will be obvious.

In the example shown in FIG. 4, it is assumed that the left front portion of the automobile has been damaged and bent inwardly and it is desired to straighten the automobile to its original shape. One end of the chain 58 is attached such as by clamps or bolts onto the body and/or frame of the automobile at point A. The clamp assembly 51 is placed on the platfrom 11 at point C and a portion of the chain 58 is hooked thereon, as will be explained.

A second clamp assembly 51 is placed at point B, spaced from point C, and on a separate beam 13. The ball 47 on strut 41 is placed in socket 49 of the second clamp assembly 51. The head 70 of the strut 41 is affixed to the chain at point D and the pin 76 placed therein to lock the head 70 on chair 58. Next, suitable hydraulic pressure is provided to strut 41, as is well known in the art, to cause extension of plunger 45 to push upwardly against chain 58.

Referring again to FIG. 4, it may be considered that the strut 41 forms a variable length leg, B-D of a triangle, the second leg B-C of which is the platform 11 and the third leg C-D of which is the portion of the chain attached to the platform. By extension of the strut 41, this triangle changes shape causing the apex D to move through an arc, the center of the arc being the point C of the chain attached to the platform, and the radius (D-C) of the arc being fixed by the chain. This swinging motion is utilized to provide a movement of that portion D-A of the chain which extends from the top of the hydraulic strut 41 to the damaged member (point A) and thereby pulls the damaged area toward a desired position (A—A).

The variety of attaching locations and positions is limited only by operator's skill. And, by the proper location of the rams and chain or chains, motion can be provided in nearly any direction desired. Thus, the invention enables the operator to maintain directional control of the applied forces with a simple setup.

The sketch of FIG. 5 which is an end view taken along the imaginary line A-C of FIG. 4 is also useful in explaining the operation of the apparatus of FIG. 4. Assume that the strut 41 is affixed to the chain 58, as shown in FIG. 4, and that the strut initially lies along the line B to D—D of FIG. 5. When the hydraulic pressure is applied to the strut 41, the plunger 45 will extend and stress the chain 58 causing the strut 41 to move in a direction toward point D in the sketch of FIG. 5. Line A-C to D—D is a fixed length link in the mechanism; the line from B to D—D is a variable length link; and, the line from B to A-C is a fixed length link. As the link B to D—D is increased in length, point D-D will be forced to move toward point D where it will reach a position of stability forming a single flat plane containing the points B, A-C and D. Movement in this direction toward point D is due to the fact that the vectoral forces acting on the system are unbalanced until such time as the forces act in a straight line which contains the points B, A-C, D.

Regardless of whether strut 41 lies on one side or the other of line B, A-C, D, the vectoral forces will tend to move the strut 41 toward a position wherein the strut 41 will be positioned in the straight line containing points B, A-C, D. Any further lengthening of strut 41 will cause rotation of point D about point C at radius C-D within the aforesaid flat plane. This swinging motion causes point A to move toward the desired position A—A.

The reaction points E and F; that is, the points holding the vehicle in position, may be in line with imaginary line A-C or may consist of other suitable anchor points, at the operator's discretion.

Figure 12:
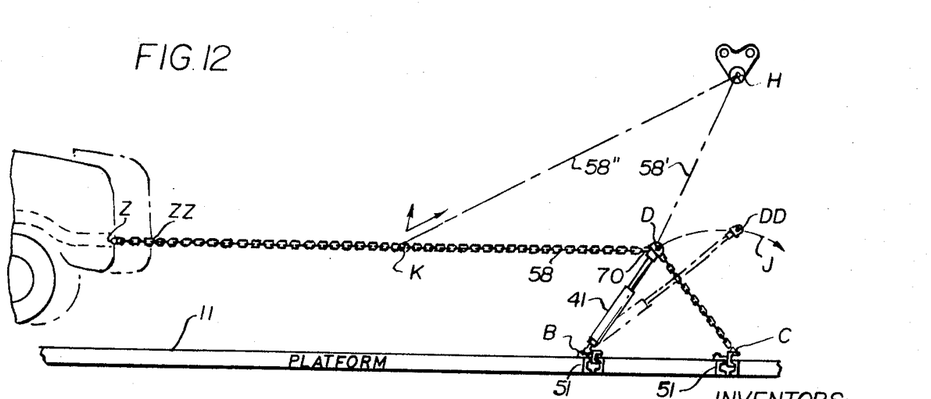
FIG. 12 (drawn on the same sheet as FIGS. 17 and 18) is a sketch useful in explaining the operation of the invention.

In the present invention, and as described hereinabove, the actuating force is applied by the hydraulic strut 41 having a reaction point on the floor or platform of the machine. Refer now also to FIG. 12, which is a sketch useful in describing various advantages and features of the apparatus of the invention in overhead type installation. Assume it is desired to provide a horizontal pulling force on the frame of the automobile to pull the frame from position Z to the position Z—Z, as indicated by the dotted lines. One end of chain 58 is hooked to the clamp 51 at position C and the other end of the chain is attached to the vehicle frame. The hydraulic strut is connected to the chain at position D and the reaction point of the strut is placed at position B. As the hydraulic strut 41 is extended the length from B to D is increased. This causes point D to move in a shallow arc having a constant radius about point C.

As the ram is extended, point D will move to a second location indicated as D—D. It can be noted that the height of point D can be controlled to be essentially in the same horizontal plane as point D—D by initially locating point D at a position close to a point vertically over point C. Thus, the change in the elevation angle of the chain 58 varies only slightly as the strut head 70 moves from point D to point D-D to thereby pull the vehicle frame to point Z—Z. Therefore, the pull on the vehicle will continue to be in essentially the same horizontal direction.

In comparison, assume that a pull is provided from an overhead source to a chain 58' such as indicated in FIG. 12. Assume a pulling force is supplied from point H tending to pull upwardly on point D of chain 58. As load is increased on the crane, point D must move on a constant radius about point C and will travel from point D towards point D—D. It can readily be seen that as point D approaches point D—D the horizontal force which chain 58 can apply to the connection point Z becomes extremely small, since nearly all of the force exerted by the overhead source will be in the vertical direction. While it is entirely possible to connect the chain 58'' to the chain 58 at a point closer to the vehicle such as at point K in FIG. 12, it can readily be seen that when such a pulling force is applied, there will be a large vertical component of force tending to lift the frame upwardly rather than in the desired horizontal direction.

Note also that the hydraulic strut 41 can be utilized to provide a force which can incline to about 30 degrees of a horizontal plane, indicated by line J in FIG. 12. Such is, of course, not feasible with an overhead type installation.

Figure 13:
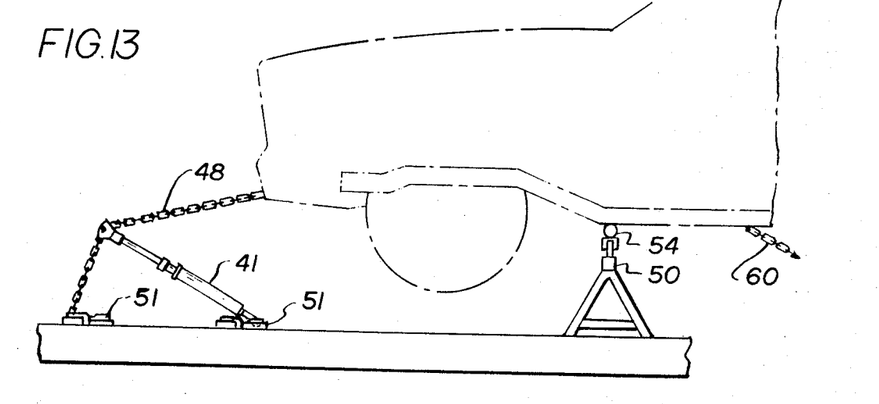
FIG. 13 and 14 show side elevational views of pulls being provided to a vehicle at different angles.

FIG. 13 shows a typical operating setup of the invention wherein a so-called mash and kick-up damage has resulted in the vehicle; that is, the front end of the vehicle has been bent upward and backward. In this type of setup, the frame is to be pulled downward and forward to correct the damage. As will be appreciated, and as clearly shown in FIG. 13, the ram is operating at relatively small angle with the horizontal plane and pulling the frame of the vehicle forward.

Figure 14:
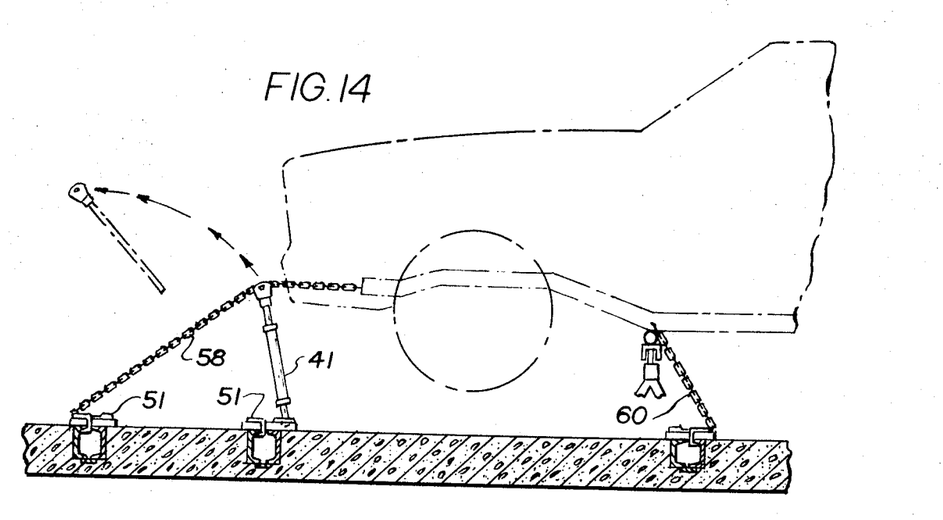

In FIG. 14 another operating setup of the apparatus of the invention is shown wherein the frame of the vehicle has been damaged and bent downwardly and it is desired to pull the damage forward and to lift the frame upwardly. In this case, the strut 41 is placed relatively near the frame to provide a vectoral force tending to lift the frame upwardly. The arrowed lines indicate the direction of movement which the strut 41 will tend to take as the frame of the vehicle is being straightened.

Figure 15:
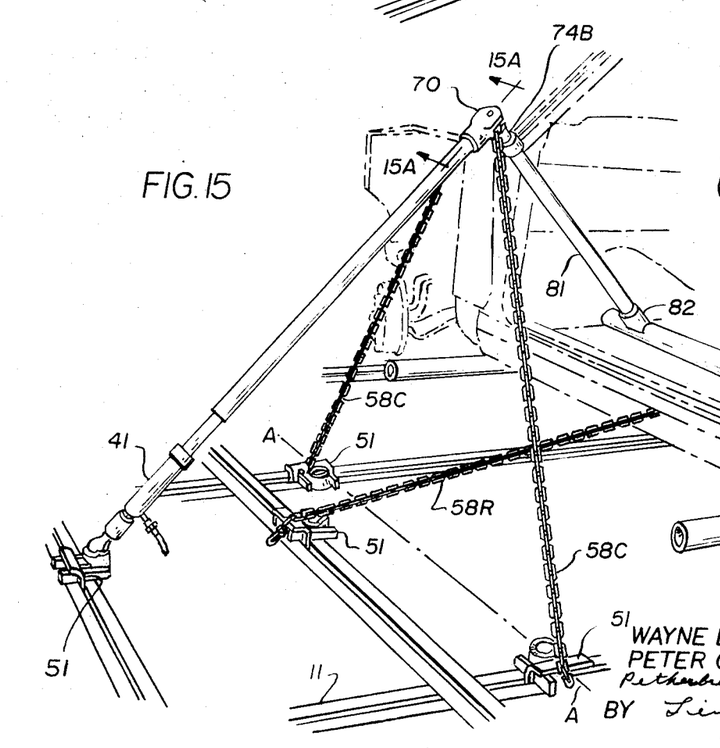
FIG. 15 is an isometric view showing the invention being utilized to provide a downward pushing force.
Figure 15A:
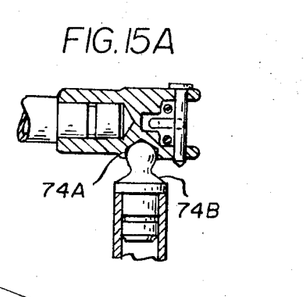
FIG. 15A is a partial section view of the connection of the head 70 to the knuckle member of FIG. 10A, and taken along line 15A—15A in FIG. 15.

FIG. 15 shows the invention being utilized to push downwardly on a portion of a vehicle. In FIG. 15, the chain 58C is anchored at both ends to the platform 11 by clamp assemblies 51. A force is applied by the strut 41 to an intermediate point of the chain 58C in a generally upwardly direction. One end of a rigid tubing arm 81 comprising suitable tubing has a knuckle 74B, see also FIG. 10A, inserted at its upper end, as oriented in FIG. 15. Knuckle 74B is received in recess 74A in head 70 as shown in FIG. 15A. The other end of arm 81 has a saddle 82 affixed thereto adapted to engage the member being straightened. Chain 58R serves as a reaction member and is connected in any suitable manner to maintain the vehicle in position. In operation, the saddle 82 is caused to come in contact with the vehicle member to be pushed downwardly. The upwardly directed force from strut 41 acting on the chain 58C causes the chain to effectively form a plane pivoting about the imaginary line A—A in FIG. 15, passing through the two clamp assemblies 51 and act to force downwardly on arm 81 which in turn applies a downwardly acting force to the vehicle member.

The plane of the chain rotates about line A—A in a direction towards the vehicle creating an axial load in member 81, and the resultant force on the vehicle will likewise be in an axial direction with respect to member 81. The direction and magnitude of this force can be adjusted by selection of the chain length, the length of hydraulic strut and the length of member 81.

The applied moment arm of the system of FIG. 15 is the shortest distance from line A—A to the center line of the hydraulic strut and the resisting moment arm is the shortest distance between line A—A and the center line of member 81. Quite high loading can be applied to the strut 41 tubing and to the tubing member 81, since the loading is essentially axial loading with very little tendency to a bending moment.

Figure 16:
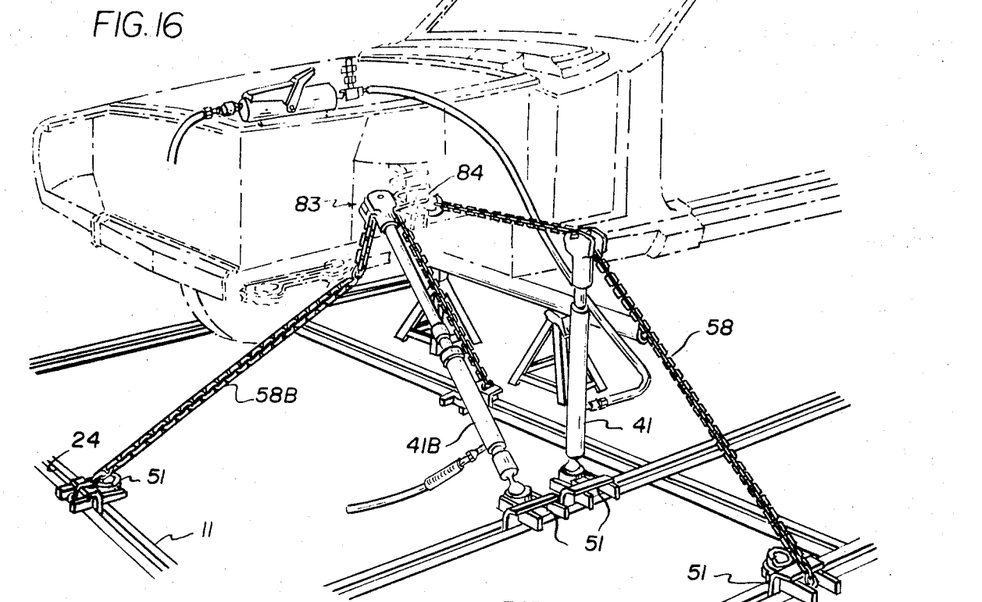
FIG. 16 is a perspective view of showing the invention being utilized to provide a torquing force.

FIG. 16 shows the inventive method being utilized to provide a push-pull or torquing force on the automobile. More explicitly, the strut 41B contacting the vehicle member at a point 83 is arranged to extend and push the member in a direction into the plane of the paper being stabilized and guided by chain 58B. The strut 41 is attached as by suitable clamps to the vehicle member at a point 84 by a chain 58. Point 84 is spaced from point 83 and the force being applied to point 84 is pulling in a direction out of the plane of the paper. Accordingly, a torquing or torsion action is provided to the vehicle member to straighten it as desired.

Figure 17:
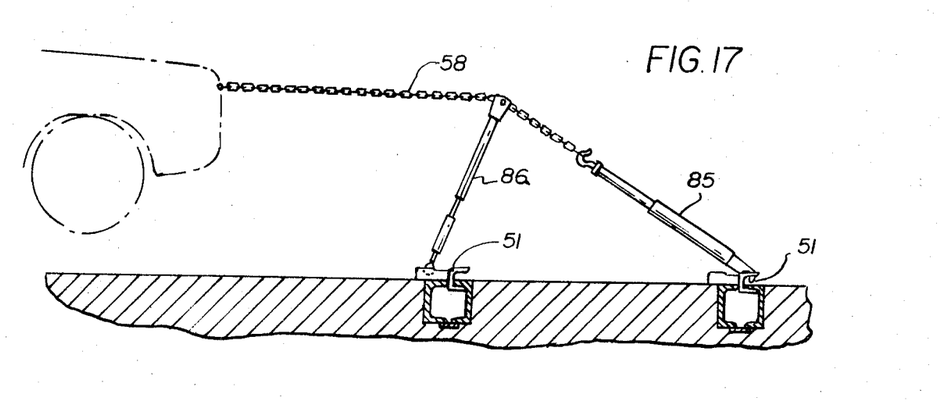
FIGS. 17 and 18 show other embodiments of the invention demonstrating other means of applying a force to a force transmitting member; and, FIG. 19 (drawn on the same sheet as FIGS. 13 and 14) is a sketch useful to show the invention utilized to apply a force in a downward direction.
Figure 18:
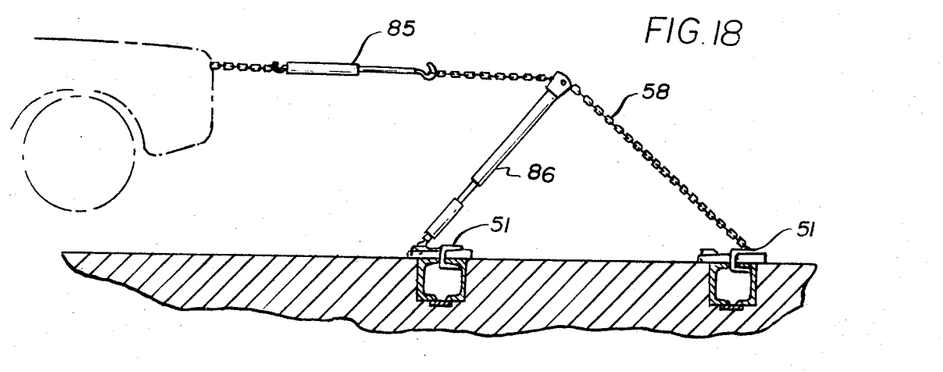

Alternate means for generating a tensile force to be applied to a vehicle is shown in FIGS. 17 and 18. In FIG. 17, a passive strut 86, that is, a fixed length strut provides a reaction force for the chain, is adjustable and freely pivotable on the clamp 51 similarly as strut 41. A hydraulic pull ram 85, winch or other pulling assembly is attached to provide a pulling force through the chain 58 to the vehicle. In FIG. 18, the ram 85 is placed intermediate the strut 86 and the vehicle to provide a pulling force to straighten the member. Note that in the apparatus of both FIGS. 17 and 18, the strut 86 is freely pivotable and swivelable.

Figure 19:
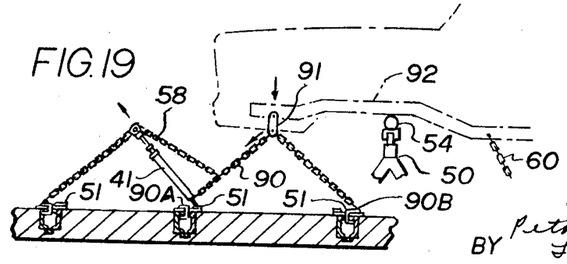

As mentioned above, the invention enables forces to be applied in any of a variety of directions. For example, FIG. 19 shows another application of the invention utilized to provide a downward pull to the frame of an automobile. In this instance, a chain 90 has its ends 90A and 90B connected to spaced clamp assemblies 51. An intermediate point on chain 90 is connected by suitable bracket means to the frame 92 to be bent downward. The tubing 54 and stand 50 support the frame 92 and a chain 60 connected to frame 92 acts as a reaction member. A second chain 58 has one end connected to another clamp assembly 51 and the other end of chain 58 is connected to a point on chain 90 intermediate the bracket 91 and chain end 90A. An upward force applied by strut 41 and chain 58 to chain 90 will change the geometry of the triangle formed by chain 90 causing a downward force as indicated by the arrows to be applied to bracket 91 and frame 92.

Further, should it be desirable for some reason to guide the straightening forces of the strut 41 as applied in any of the setups shown in any of example FIGS. 4, 16, 19, etc. in a particular direction, this can be conveniently done by connecting additional chains to the force applying chains to guide these units as desired.

In the embodiment of the invention herein described a flexible force transmitting means is utilized. However elongated rigid members which are incrementally adjustable in length to obtain the desired geometry for each pulling set-up could also be utilized. For different length pulls different lengths of rigid members are employed.

The foregoing substitution of rigid for flexible force transmitting means is possible due to the fact that once the flexible force transmitting means is stressed, it acts as a rigid tensile member. However, in practice, flexible force transmitting means such as chains have been found to be more convenient to use.

Note also that while the invention has been particularly described as applicable to the reforming and straightening of bent vehicle bodies and frames thereof, the method and apparatus of the invention can likewise be employed to reform and straighten doors, bumpers, hoods, etc., which may be on the vehicle or removed therefrom. Further, other types of members can likewise be reformed or straightened by the inventive method and apparatus.

Also, in the embodiment of the invention herein described, the force applying means is rotatable 360° about a vertical axis. However, for certain applications, a force applying means with a more limited amount or degree of rotation is satisfactory.

While the invention has been particularly shown and described with reference to preferred embodiments thereof, it will be understood by those skilled in the art that various changes in form and details may be made therein without departing from the spirit and scope of the invention.

We claim:

1. A strut assembly arranged to be positioned in a holder means comprising in combination:
    a stationary section;
    an extension member received in said stationary section;
    said stationary section being connected to hydraulic means for selectively actuating said extension member outwardly therefrom;
    a base on the end of said stationary section for fitting into associated holder means permitting free pivotable and rotatable motion of said stationary section;
    a force applying head on said extension member, said head including a recess in a side thereof;
    a nipple unit having a nipple at one end which is insertable in said recess and means at its other end connecting said nipple unit to an associated rigid member whereby movement of said head exerts a pushing force on said rigid member through said connecting nipple unit; and
    means for locking said head in force applying position.

2. A strut assembly as in claim 1:
    wherein said stationary section comprises a cylinder having an ball base on one end and receiving said extensible tubing in said other end;
    said extensible member comprises tubing on which said head may be removably mounted.

3. A strut assembly as in claim 1 wherein said head comprises a U-shaped section having a bight portion and spaced flanges, and said bight portion includes a slot for receiving and holding links of a chain.

4. A hydraulically actuable force applying strut for applying force to a chain, said strut comprising an extension member, a cylinder for reciprocably receiving said extension member, means for actuating said extension outwardly from said cylinder, a ball member on one end of said cylinder capable of being removably fitted in a receiving socket to pivotally rotate and swivel therein, a chain receiving head on one end of said extension member comprising a U-shape section having a bight portion and spaced flanges, slots in said bight portion for receiving the chain and apertures in said flanges for receiving a pin for locking an associated chain in position in said head.

5. In an apparatus for applying a force to a vehicle body comprising a hydraulically actuable strut having a plunger supported therein and extendable upon the actuation of said strut, said plunger adapted to transmit a controllable force, the improvement comprising;
    a U-shaped force transmitting head carried by one end of said plunger,
    said force transmitting head including opposed flanges spaced by a center bight portion,
    said center bight porton having a slot formed therein for receiving a chain for transmitting forces to a vehicle body,
    said opposed flanges each having an aperture formed therein for receiving a lock pin, and
    a lock pin adapted for insertion through said apertures into engagement with a chain carried in said slot formed in said center bight portion to prevent the chain from slipping from said center bight portion during force transmission.

6. The apparatus of claim 5 further including a recess formed in one of said flanges for removably receiving a knuckle member, and a knuckle member insertable into said recess to extend outwardly from said flange, adapted for connection with a rigid member to transmit forces therethrough.

* * * * *

UNITED STATES PATENT OFFICE
CERTIFICATE OF CORRECTION

Patent No. 3,754,427    Dated August 28, 1973

Inventor(s) Wayne E. Hunnicutt, et al.

It is certified that error appears in the above-identified patent and that said Letters Patent are hereby corrected as shown below:

Column 1, line 6, the word "damaped" should read -- damaged --.

Signed and sealed this 26th day of February 1974.

(SEAL)
Attest:

EDWARD M. FLETCHER, JR.
Attesting Officer

C. MARSHALL DANN
Commissioner of Patents